United States Patent
Matson et al.

(10) Patent No.: US 12,216,265 B2
(45) Date of Patent: Feb. 4, 2025

(54) AUTO-FOCUS NIGHT VISION DEVICE

(71) Applicant: MATBOCK Origins, LLC, Virginia Beach, VA (US)

(72) Inventors: Sean Matson, Virginia Beach, VA (US); Zach Steinbock, Virginia Beach, VA (US)

(73) Assignee: MATBOCK Origins, LLC, Virginia Beach, VA (US)

( * ) Notice: Subject to any disclaimer, the term of this patent is extended or adjusted under 35 U.S.C. 154(b) by 0 days.

(21) Appl. No.: 18/505,934

(22) Filed: Nov. 9, 2023

(65) Prior Publication Data

US 2024/0329384 A1    Oct. 3, 2024

Related U.S. Application Data

(60) Provisional application No. 63/382,993, filed on Nov. 9, 2022.

(51) Int. Cl.
| | | |
|---|---|---|
| G02B 23/12 | (2006.01) | |
| G02B 13/16 | (2006.01) | |
| G02B 25/00 | (2006.01) | |

(52) U.S. Cl.
CPC .......... *G02B 23/12* (2013.01); *G02B 13/16* (2013.01); *G02B 25/001* (2013.01)

(58) Field of Classification Search
CPC ....... G02B 23/12; G02B 13/16; G02B 25/001
See application file for complete search history.

(56) References Cited

U.S. PATENT DOCUMENTS

| | | | | |
|---|---|---|---|---|
| 7,969,673 B2 * | 6/2011 | Hanna | ............. | G02B 23/12 |
| | | | | 359/410 |
| 10,924,685 B2 * | 2/2021 | Totsch | ............. | H04N 23/10 |

* cited by examiner

*Primary Examiner* — Seung C Sohn
(74) *Attorney, Agent, or Firm* — Stinson LLP

(57) ABSTRACT

A night vision device has an objective lens mounted on a housing, and arranged for receiving light from ambient into the housing. An image intensifier and an eyepiece lens are also mounted on the housing. An adjustable iris defining an iris opening is mounted on the housing on an end of the housing generally opposite to where the objective lens is mounted. A sensor for detecting light intensity is connected to the housing and located toward the second end of the housing. The sensor controls the size of an area of the iris opening in response to the light intensity detected for keeping the area of the iris small so as to maintain a depth of field of the night vision device.

11 Claims, 1 Drawing Sheet

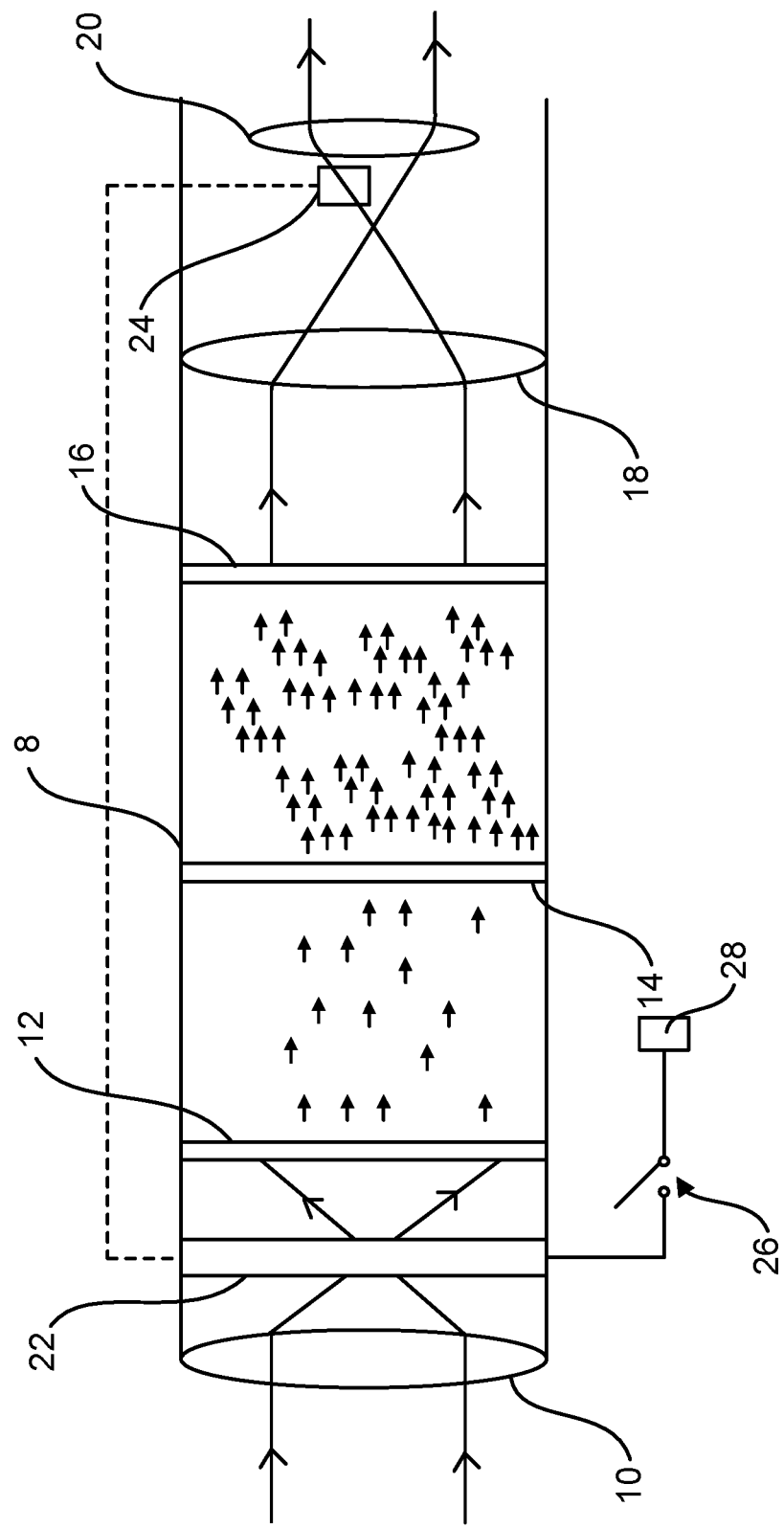

AUTO-FOCUS NIGHT VISION DEVICE

FIELD OF THE INVENTION

The present disclosure generally relates to human vision enhancement and more particular to a night-vision system capable of automatic focusing.

BACKGROUND OF THE INVENTION

Night vision devices for enhancing the ability of humans to see at night and/or in other low light situations have been used for over eighty years. In general, these devices operate by intensifying the light collected by the devices so that a person using the night vision device can more readily see poorly illuminated objects. Some night vision devices are passive, relying entirely upon ambient light, while others may include their own illumination equipment to increase the light collected by the night vision device. One problem associated with night vision devices is that if there are substantial changes in the amount of light entering the device, the user may be temporarily blinded. It is known to use bright source protection which operates to reduce the voltage to the light intensifier when it is detected that there is a higher amount of light (referred to as "auto-gating"). Another problem associated with the use of night vision devices is that the depth of field can be very limited, making it difficult for the user to see people or objects that are located at a distance that is nearer to the user or farther from the user than the focal length of the night vision device. In the context of use of night vision devices by the military, the soldier may go from a location outside where there is greater ambient light, to a location inside a building or other structure. Once inside the building people or objects encountered are in a near field and so may appear out of focus to the soldier. As a practical matter, the soldier often removes the night vision device or will be concentrating on adjusting the objective lens of the night vision device to bring the subject into focus. Either process can take several seconds that could prove fatal to the soldier.

SUMMARY

In one aspect of the present invention, a night vision device constructed according to the principles of the present invention generally comprises a housing having a first end and a second send. An objective lens mounted on the housing nearer to a first end than a second end is arranged for receiving light from ambient into the housing. An image intensifier is mounted on the housing and located toward the second end of the housing from the objective lens. An eyepiece lens mounted on the housing is located toward the second end of the housing from the image intensifier. An adjustable iris defines an iris opening. The adjustable iris is mounted on the housing and located toward the second end of the housing from the objective lens. A sensor for detecting light intensity connected to the housing and located toward the second end of the housing is configured to control a size of an area of the iris opening in response to the light intensity detected for keeping the area of the iris small so as to maintain a depth of field of the night vision device.

In another aspect of the present invention, a method of operating a night vision device generally comprises measuring at a location proximate the eye of the user the intensity of light reaching the user's eye. The measured light intensity is used to maintain a depth of field of the night vision device large so long as the amount of light reaching the user's eye from the night vision device is sufficient to permit visual perception.

Other objects and features of the present invention will be in part apparent and in part pointed out hereinafter.

BRIEF DESCRIPTION OF THE DRAWING

FIG. 1 is a schematic longitudinal section of a night vision device.

Corresponding reference characters indicate corresponding parts in the drawing.

DETAILED DESCRIPTION

Referring now to the drawing, the night vision device includes a housing 8 having a first end and a second end. An objective lens 10 that receives ambient light is mounted on the housing 8 and located nearer to the first end than to the second end. As illustrated, the objective lens is located at the first end of the housing 8. Light received by the objective lens 10 is directed to a photocathode plate 12 supported in the housing 8. Although the objective lens 10 is shown as a single, unitary lens it may have other configurations having more than one lens. The photocathode plate 12 is negatively charged. Light impinging on the photocathode plate 12 causes electrons to be released from the photocathode plate, which are then accelerated toward a microchannel plate 14 (e.g., an intensifier) biased to a higher voltage than the photocathode plate. Impact of the electrons on the microchannel plate 14 causes an even greater number of electrons to be released, thereby effectively augmenting the intensity of the image. In the illustrated embodiment, the photocathode plate 12 and microchannel plate 14 can be considered "an image intensifier." However, other components and arrangements could be used for the purpose of strengthening the image signal. The image intensifier is mounted on the housing 8 and generally located toward the second end of the housing from the first end.

A phosphor screen 16 is biased to an even higher voltage than the microchannel plate 14. Electrons from the microchannel plate 14 are accelerated toward and impinge upon the phosphor screen 16. Generally, the phosphor screen 16 has been green, but more recently has been white. However, any suitable color may be used. As a result of the electron impingement, the phosphor screen 16 emits photons that pass through a first eyepiece lens 18 and a second eyepiece lens 20 to the user's eye (not shown). The first and second eyepiece lenses 18, 20 are mounted on the housing 8 and located toward the second end of the housing from the objective lens 10. As illustrated, the second eyepiece lens 20 is located at the second end of the housing 8. The user would position his or her eye just to the right of the second end of the housing 8. It will be understood that there may be a greater or fewer number of eyepiece lenses than shown, and at least some of the components may be located other than as illustrated. Moreover, the precise configuration and number of lenses, plates and screens may be other than described.

The night vision device is constructed to permit auto-focusing for the purpose of automatically maintaining the largest depth of field allowed by the ambient light available. In that regard, the night vision device includes an adjustable iris 22 mounted on the housing 8 and located toward the second end of the housing from the first objective lens. As illustrated, the adjustable iris 22 is positioned between the objective lens 10 and the photocathode plate 12. Keeping the iris opening small maximizes the depth of field of the night vision device. Having a large depth of field means that persons and objects viewed through the night vision device will be in focus for the viewer over a greater range of distance from the viewer (and the night vision device). However, restricting the iris opening reduces the amount of light that impinges upon the photocathode plate 12. Depending upon the amount of light available, the night vision device may not be able to intensify the image sufficiently to be seen if the iris opening is too small. Accordingly, a light intensity sensor 24 is connected to the housing 8 and positioned proximate the viewer's eye to measure the intensity of light that reaches the viewers eye. In the illustrated embodiment, the sensor 24 is positioned just before the second eyepiece lens 20. The sensor 24 is connected to a motor forming part of the adjustable iris 22.

The sensor 24 operates to keep the depth of field of the night vision device generally as large as possible given the amount of available (ambient) light. For example, when the sensor 24 detects that light reaching the user's eye has fallen below a predetermined minimum or boundary, the sensor sends a signal to the motor of the adjustable iris 22. The signal causes the motor to open the iris 22. The amount the iris 22 is opened can be a predetermined increment, based on the amount by which the light detected by the sensor 24 falls below the minimum set point, or in according to another suitable algorithm. Increasing the area of the opening of the iris 22 increases the amount of light passing through. When the sensor 24 detects light within an acceptable range, the opening if the adjustable iris 22 is held. Increasing the area of the opening of the iris 22 reduces somewhat the depth of field of the night vision device. When the user of the night vision device moves into an environment in which there is more light, this is detected by the sensor 24. As a result of the detected light intensity being above a maximum or upper boundary, a signal is sent to the adjustable iris 22 causing the iris opening to become smaller. For example, the signal may be sent when the light detected by the sensor 24 exceeds a predetermined amount. Closing the iris 22 increases the depth of field, causing the surrounding people and objects to be in focus over a greater range from the user of the night vision device. The upper and lower light intensity boundaries used by the sensor may be adjusted, for example according to the visual acuity of the particular user. The lower light intensity boundary is selected to that there is a good visual perception of the image being viewed through the night vision device. It is envisioned that the sensor 24 may simply signal the level of light intensity and that the algorithm determining how much to adjust the iris opening can be associated with the adjustable iris 22. Generally, the control of the iris 22 is biased to keep the opening as small as possible while permitting visual perception of the surroundings. The sensor 24 is shown schematically as being connected to the iris 22, but could be connected to another device controlling the iris. Although the night vision device is discussed in terms of being worn, it will be understood that is but one configuration within the scope of the present invention. The night vision device could be carried or mounted on another object (e.g., a firearm) within the scope of the present invention.

In one embodiment, when the control of the iris 22 is activated, an algorithm operates to open the iris be stepped amounts. As each step is reached, the sensor 24 is queried to learn the amount of light now reaching the sensor. If the amount of light is below a predetermined level, the iris 22 is controlled to open another stepped amount. This process is repeated until a desired light intensity at the sensor 24 is reached. However, this process does not end. If the light intensity above the desired amount by more than a predetermined threshold, the iris 22 will be controlled to close by a stepped amount (typically smaller than the steps used for opening the iris). Only when the light intensity at the sensor 24 lies within a predetermined boundary does the adjustment of the iris opening stop. The presence of the upper boundary and step-down function allows the field of view to be maximized at all times. In a fully automatic mode, the algorithm runs continuously based on variances experienced by the sensor 24 in the light level. This is effective, but has a greater power demand on the battery 28. Accordingly, in a semi-automatic mode (sometimes referred to as a "manual" mode), the algorithm would run only when a button (not show) on the night vision device is pressed. For example, when a soldier moves from one location (e.g., outside) to another location (e.g., inside a building), the solder must press the button in order to cause the algorithm to run and adjust the iris opening and hence the light intensity. It should be understood that predetermined threshold above the desired amount of light intensity used by the algorithm is not selected for purposes of preventing the user from being unable to see due to the light intensity being too great, but rather is selected to drive the iris opening at any given light level toward a predetermined minimum necessary for visual perception.

A power switch 26 and power source (e.g., a battery 28), both schematically illustrated, can be provided to permit automatic adjustment of the iris opening of the adjustable iris 22 when switched on. A power adjustment of the objective lens is also permitted using structures and techniques well known to those of ordinary skill in the art. It is envisioned that when the power switch is switched off that (fully) manual adjustment would be permitted. More specifically, manual adjustment of both the iris opening, and also of the objective lens is permitted for purposes of changing the focus of the objective lens. Suitable structure (not shown) is provided that is accessible on the exterior of the housing for making the adjustments.

In still another embodiment, the night vision device has different settings. For example, there may be a low, medium and high setting. The low setting would reduce the light intensity number used to control the opening of the iris 22. The medium setting would increase that intensity number. The high setting would increase the light intensity number further. In this way, the user can select an operating mode that corresponds with their particular visual acuity. In other words, some users have a greater ability to see in low light situations that others. Those users could select the medium or low setting and thereby even further improve the field of view in operation of the night vision device.

Taking as an example, the use by an infantryman on patrol using the night vision device, when the user is outside, there may be ample light (e.g., from the moon and/or stars). In that case, the sensor 24 will cause the adjustable iris 22 to shut down the opening substantially, giving the infantryman a large depth of field from near to the user to a substantial distance away in which objects will be in focus. However, the infantryman may move into a building or other structure that is unlit and moreover blocks out much of the light available out of doors. The night vision device of the current invention detects (using sensor 24) the drop in light being admitted into the night vision device and automatically opens the iris 22. However, the opening occurs only to the extent required to make people and objects visible to the user. Once sufficient light intensity is detected by the sensor 24, the iris is opened no further, and may be closed somewhat even if the light intensity being experienced would not result in any loss of visual perception. As a result, the depth of field is maintained as large as permitted by the available light. In one sense, the night vision device has an image intensifier and an adjustable iris which cooperate to maintain a large depth of field of vision while maintaining the amount of light reaching the user's eye at a level permitting visual perception of the object(s) viewed.

Having described the invention in detail, it will be apparent that modifications and variations are possible without departing from the scope of the invention defined in the appended claims. For example, where specific dimensions are given, it will be understood that they are exemplary only and other dimensions are possible.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A night vision device comprising:
   a housing having a first end and a second send;
   an objective lens mounted on the housing nearer to a first end than a second end, and arranged for receiving light from ambient into the housing;
   an image intensifier mounted on the housing and located toward the second end of the housing from the objective lens;
   an eyepiece lens mounted on the housing and located toward the second end of the housing from the image intensifier;
   an adjustable iris defining an iris opening, the adjustable iris being mounted on the housing and located toward the second end of the housing from the objective lens;
   a sensor for detecting light intensity connected to the housing and located toward the second end of the housing, the sensor being configured to control a size of an area of the iris opening in response to the light intensity detected for keeping the area of the iris small so as to maintain a depth of field of the night vision device.

2. The night vision device as set forth in claim 1 wherein the sensor is configured to maintain the area of the iris opening so long as the light intensity detected remains in a range between an upper boundary and a lower boundary.

3. The night vision device as set forth in claim 2 wherein the sensor is configured to cause the area of the iris opening to increase if the light intensity detected is below the lower boundary, and to cause the area of the iris opening to decrease when the light intensity detected is above the upper boundary.

4. The night vision device as set forth in claim 3 wherein at least one of the upper and lower boundaries is adjustable.

5. The night vision device as set forth in claim 1 further comprising a power switch operable to turn the night vision device on and off so that the night vision device can operate automatically when turned on or switched off to allow manual operation of both the objective lens focus and the size of the iris opening.

6. A method of operating a night vision device comprising measuring at a location proximate the eye of the user the intensity of light reaching the user's eye, using the measured light intensity to maintain a depth of field of the night vision device large so long as the amount of light reaching the user's eye from the night vision device is sufficient to permit visual perception.

7. The method of operating a night vision device as set forth in claim 6 wherein said step of using the measured light intensity comprises maintaining an adjustable opening of an iris only as large as required to permit visual perception.

8. The method of operating a night vision device as set forth in claim 7 wherein said step of measuring the intensity of light reaching the user's eye comprises reading the level of light intensity using a sensor positioned in the night vision device proximate to the position at which the user positions the eye for using the night vision device.

9. The method of operating a night vision device as set forth in claim 8 further comprising adjusting the sensor according to the visual acuity of the user.

10. The method of operating a night vision device as set forth in claim 6 further comprising intensifying the light received from an objective lens at an input end of the night vision device.

11. The method of operating a night vision device as set forth in claim 6 wherein measured light intensity can be used to automatically close the iris opening if by opening the iris opening the light intensity measured becomes larger than a maximum amount.

* * * * *